(12) United States Patent
Park

(10) Patent No.: US 12,283,018 B2
(45) Date of Patent: Apr. 22, 2025

(54) METHOD AND APPARATUS FOR PROVIDING USER-INTERACTIVE CUSTOMIZED INTERACTION FOR XR REAL OBJECT TRANSFORMATION

(71) Applicant: ELECTRONICS AND TELECOMMUNICATIONS RESEARCH INSTITUTE, Daejeon (KR)

(72) Inventor: Hye Sun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 17/936,694

(22) Filed: Sep. 29, 2022

(65) Prior Publication Data

US 2023/0215121 A1 Jul. 6, 2023

(30) Foreign Application Priority Data

Jan. 5, 2022 (KR) .................... 10-2022-0001718

(51) Int. Cl.
*G06T 17/00* (2006.01)
*G06T 7/10* (2017.01)
(Continued)

(52) U.S. Cl.
CPC .............. *G06T 19/20* (2013.01); *G06T 7/10* (2017.01); *G06T 7/40* (2013.01); *G06T 15/04* (2013.01);
(Continued)

(58) Field of Classification Search
CPC ......... G06T 17/20; G06T 19/00; G06T 17/00; G06T 17/10; G06T 17/005; G06T 7/62; G06T 2207/30196; G06T 19/20; G06T 7/10; G06T 7/40; G06T 15/04; G06T 19/006; G06T 2200/24; G06T 2219/2012; G06T 2219/2021; G06V 10/761
(Continued)

(56) References Cited

U.S. PATENT DOCUMENTS 8,786,613 B2 7/2014 Millman
9,881,423 B2 1/2018 Cho
(Continued)

FOREIGN PATENT DOCUMENTS

KR 10-2017-0053198 A 5/2017
KR 10-2019-0107611 A 9/2019
(Continued)

*Primary Examiner* — Gordon G Liu

(57) ABSTRACT

A method of providing a user-interactive customized interaction for a transformation of an extended reality (XR) real object includes segmenting a target object from an input image received through a camera, extracting a similar target object having a highest similarity to the target object from three-dimensional (3D) model data that has been previously learnt, extracting texture of the target object through the camera and mapping the texture to the similar target object, transforming a shape of the similar target object by incorporating intention information of a user based on a user interaction, and rendering and outputting the transformed similar target object.

20 Claims, 10 Drawing Sheets

(51) Int. Cl.
    *G06T 7/40*           (2017.01)
    *G06T 15/04*         (2011.01)
    *G06T 19/00*         (2011.01)
    *G06T 19/20*         (2011.01)
    *G06V 10/74*         (2022.01)

(52) U.S. Cl.
    CPC .......... *G06T 19/006* (2013.01); *G06V 10/761* (2022.01); *G06T 2200/24* (2013.01); *G06T 2219/2012* (2013.01); *G06T 2219/2021* (2013.01)

(58) Field of Classification Search
    USPC ........................................................ 345/420
    See application file for complete search history.

(56) References Cited

U.S. PATENT DOCUMENTS

| | | |
|---|---|---|
| 10,417,829 B2 | 9/2019 | Kim |
| 2009/0138468 A1* | 5/2009 | Kurihara ............. G06F 16/5838 707/999.005 |
| 2012/0170855 A1* | 7/2012 | Maeda .................. G06F 16/583 382/218 |
| 2019/0164346 A1* | 5/2019 | Kim ....................... G06T 15/005 |
| 2021/0110557 A1* | 4/2021 | Busey ..................... G06N 3/045 |

FOREIGN PATENT DOCUMENTS

| | | |
|---|---|---|
| KR | 10-2021-0012233 A | 2/2021 |
| KR | 10-2282739 B1 | 7/2021 |

\* cited by examiner

FIG. 3A
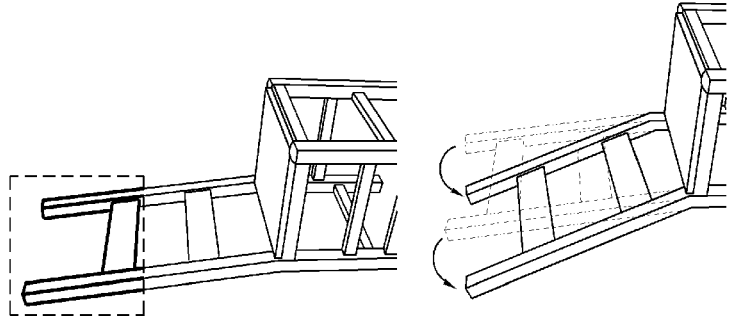
PREDICTED [EXPECTED] TRANSFORMATION SHAPE
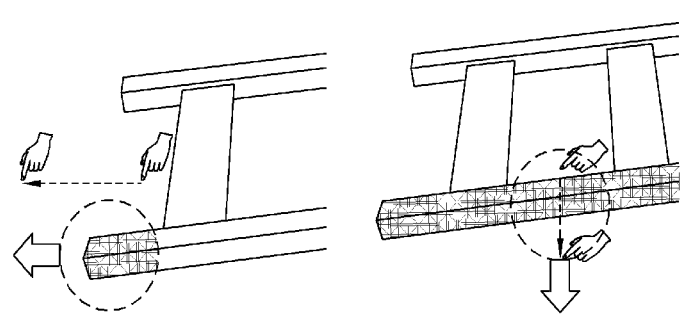
TRANSFORMATION BY USER
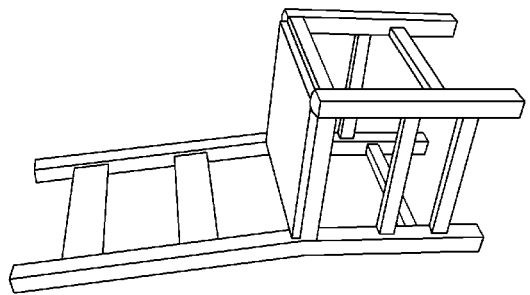
INPUT 3D MODEL

FIG. 3C
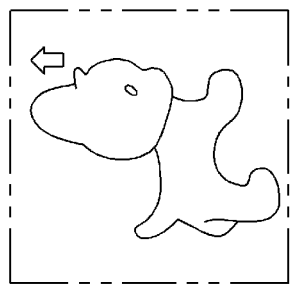
INPUT 3D MODEL
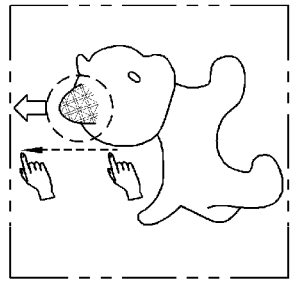
TRANSFORMATION BY USER
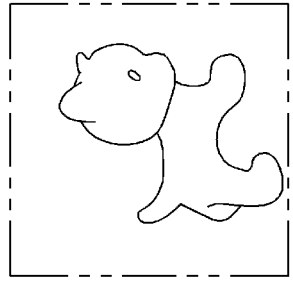
PREDICTED [EXPECTED] TRANSFORMATION SHAPE

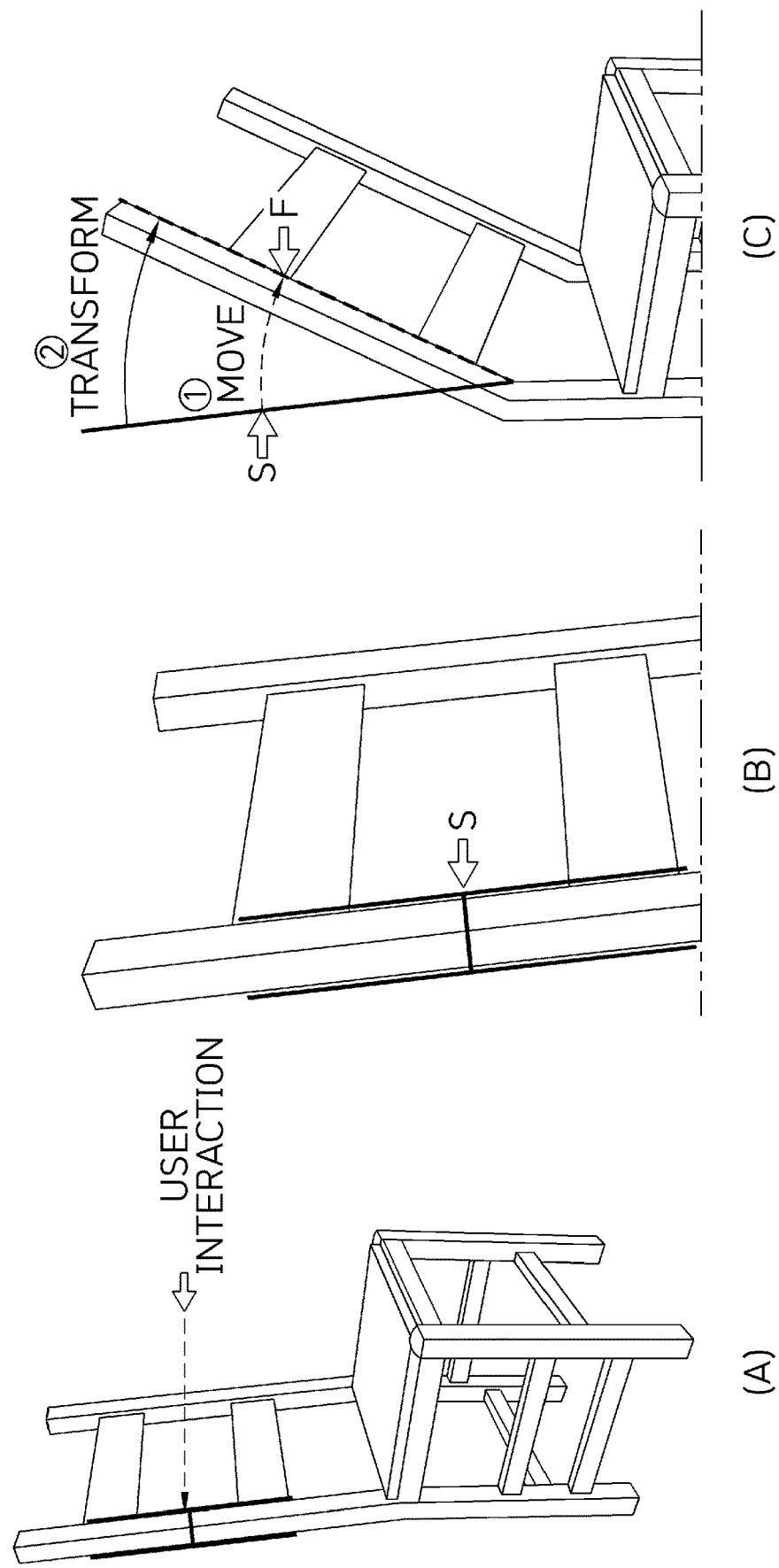

FIG. 5
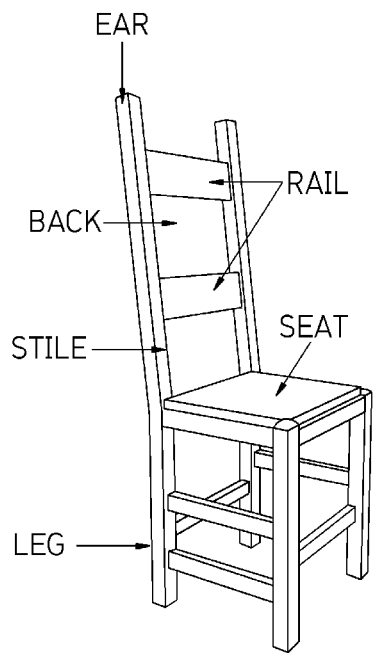
<LADDERBACK CHAIR>
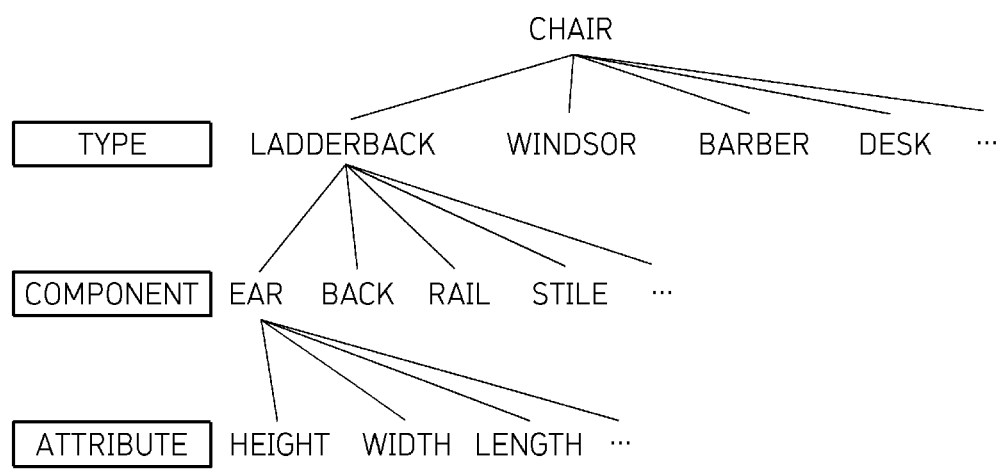

METHOD AND APPARATUS FOR PROVIDING USER-INTERACTIVE CUSTOMIZED INTERACTION FOR XR REAL OBJECT TRANSFORMATION

CROSS-REFERENCE TO RELATED APPLICATION

This application claims priority to and the benefit of Korean Patent Application No. 10-2022-0001718, filed on Jan. 5, 2022, the disclosure of which is incorporated herein by reference in its entirety.

BACKGROUND

1. Technical Field

The present disclosure relates to a method and apparatus for providing a user-interactive customized interaction for the transformation of an extended reality (XR) real object.

2. Related Art

Extended reality (XR) means a super realistic type technology and service that is a concept that puts together all virtual reality (VR), augmented reality (AR), and mixed reality (MR) and that is wide and has various levels.

With the development of such an XR technology, there is a need for a technology which enables a user to interactively transform a real-world object as he or she intended based on various generic technologies in a situation in which the generic technologies, such as a vision technology or a graphic technology necessary for the XR technology, are developed.

SUMMARY

Various embodiments are directed to a method and apparatus for providing a user-interactive customized interaction for the transformation of an extended reality (XR) real object, which enable a user to easily transform a real object as he or she intended and to change and use a transformation mode depending on a transformation purpose of the real object in XR.

However, an object to be solved by the present disclosure is not limited to the aforementioned object, and other objects may be present.

A method of providing a user-interactive customized interaction for a transformation of an extended reality (XR) real object according to a first aspect of the present disclosure includes segmenting a target object from an input image received through a camera, extracting an object (hereinafter referred to as a "similar target object") having a highest similarity to the target object from three-dimensional (3D) model data that has been previously learnt, extracting texture of the target object through the camera and mapping the texture to the similar target object, transforming a shape of the similar target object by incorporating intention information of a user based on a user interaction, and rendering and outputting the transformed similar target object.

Furthermore, an apparatus for providing a user-interactive customized interaction for the transformation of an XR real object according to a second aspect of the present disclosure includes a communication module configured to receive an image captured by a camera, a memory in which a program for transforming and rendering a target object by incorporating intention information of a user based on a user interaction has been stored, and a processor configured to segment the target object from the input image when executing the program stored in the memory, extract an object (hereinafter referred to as a "similar target object") having a highest similarity to the target object from 3D model data that has been previously learnt, extract texture of the target object through the camera, map the texture to the similar target object, and transform and render a shape of the similar target object by incorporating the intention information of the user based on the user interaction.

A computer program according to another aspect of the present disclosure executes the method of providing a user-interactive customized interaction for the transformation of an XR real object in association with a computer, that is, hardware, and is stored in a computer-readable recording medium.

Other details of the present disclosure are included in the detailed description and the drawings.

According to an embodiment of the present disclosure, an interactive XR transformation service that is more intuitive and easy can be provided to a user by providing a customized GUI for each attribute of a real object and each user.

Effects of the present disclosure which may be obtained in the present disclosure are not limited to the aforementioned effects, and other effects not described above may be evidently understood by a person having ordinary knowledge in the art from the following description.

BRIEF DESCRIPTION OF THE DRAWINGS

FIGS. 3a to 3c are diagrams for describing modified embodiments into which intention information of a user for a target object has been incorporated.

FIG. 4 is a diagram for describing an embodiment of an affordance-based visualization GUI.

FIG. 5 is a diagram for describing attributes information of an object in an embodiment of the present disclosure.

DETAILED DESCRIPTION

Figure 1:
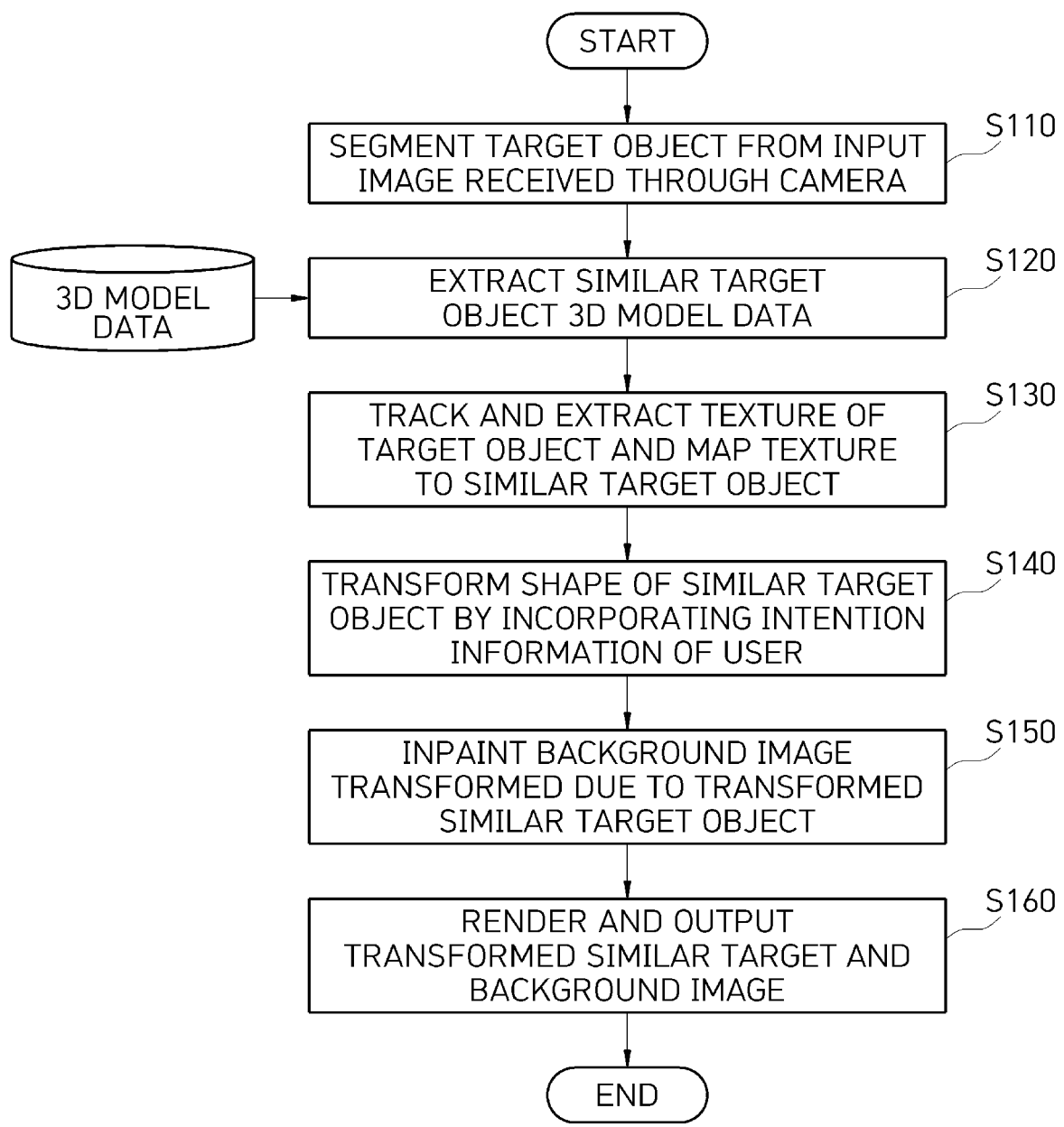
FIG. 1 is a flowchart of a method of providing a user-interactive customized interaction according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. The term "and/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, in order to help understanding of those skilled in the art, a proposed background of the present disclosure is first described and an embodiment of the present disclosure is then described.

Recently, as the vision technology and the graphic technology are infinitely developed, a technology for restoring a real-world environment in a three-dimensional (3D) way is being developed with good performance in terms of both its speed and accuracy. Furthermore, a 3D real object that has been restored as described above gradually becomes transformable.

The existing technology is a technology that puts together a virtual 3D object model in the real world by disposing the virtual 3D object model in a 3D real world. For example, "IKEA", that is, a furniture brand, provides an app through which a user can be provided with a 3D model of a real object that is sold by IKEA and the user may actually dispose the 3D model in his or her home in an XR form.

In the beginning, IKEA focused on only a technology for simply displaying, within a 3D space, a 3D virtual model of an object in the XR form without taking into consideration a correlation with the object in the real world. Thereafter, vision technologies (e.g., occlusion and a collision) and graphic technologies (e.g., lighting and rendering) in which the correlation relation has been taken into consideration have gradually been developed. All of such technologies are technologies that put together a virtual object and the real world within the real world.

In addition, a technology that attempts to transform the real world is also recently developed. Such a technology is a technology for very precisely restoring a real object in the real world in the form of a 3D model, well arranging the real object in the real world according to its original deployment, and then transforming a 3D model very similar to the restored real object so that a user feels as if the real object is transformed.

Such a technology is still an initial development stage. In order for the corresponding technology to be realized, various fields (e.g., vision, graphic, and HCI technologies in terms of software (SW) and an optical technology in terms of hardware (HW)) need to be developed together. Basically, if basic technologies, such as a technology for restoring the real world in the form of a 3D model more accurately and finely, a technology for segmenting and recognizing a space and objects within the space, and a real-time object tracking technology, are well developed, based on the basic technologies, a 3D model of a real object that is present in the real world may be generated, the 3D model may be moved from its current location in the real world to another location as if a virtual object is disposed in a conventional technology, the direction of the 3D model may be changed, and a shape of the 3D model may be transformed based on attributes of the 3D model.

Accordingly, if the XR-generic technology is developed, there is a need for an interaction technology that is finer than an interaction technology in which a user manipulates a virtual object in the existing VR or AR. In particular, an interaction technology that will be applied is also different depending on whether a user is an expert or an ordinary person.

To this end, a method and apparatus for providing a user-interactive customized interaction for the transformation of an XR real object according to an embodiment of the present disclosure provide a technology which enables a user to interactively easily change a 3D object of a real object in the real world in real time as he or she intended and to change and use a transformation mode depending on a transformation purpose of the real object in XR.

Hereinafter, a method of providing a user-interactive customized interaction for the transformation of an XR real object (hereinafter referred to as a "method of providing a user-interactive customized interaction") according to an embodiment of the present disclosure is described with reference to FIGS. 1 to 6d.

FIG. 1 is a flowchart of the method of providing a user-interactive customized interaction according to an embodiment of the present disclosure.

In an embodiment of the present disclosure, first, a target object is segmented from an input image that is received through a camera (S110). In this case, the target object means a target object to be transformed by a user among real objects.

Next, an object having the highest similarity to the target object (hereinafter referred to as a "similar target object") is extracted from 3D model data that has been previously learnt (S120).

Next, texture of the target object is detected by tracking the target object through the camera. The detected texture is mapped to the extracted similar target object (S130).

Next, the similar target object is mesh-transformed by incorporating intention information of a user based on a user interaction (S140).

Next, a background image transformed due to the transformed similar target object is inpainted from the input image that is received in real time through the camera in steps S110 and S130, with respect to an image (or background) of the target object (S150). In this case, in step S150, a pre-trained model may be applied in order to inpaint the background image.

Next, the transformed similar target object and the transformed background image are rendered and output (S160).

The steps illustrated in FIG. 1 may be understood as being performed by the apparatus 100 for providing a user-interactive customized interaction, but the present disclosure is not essentially limited thereto.

Figure 2:
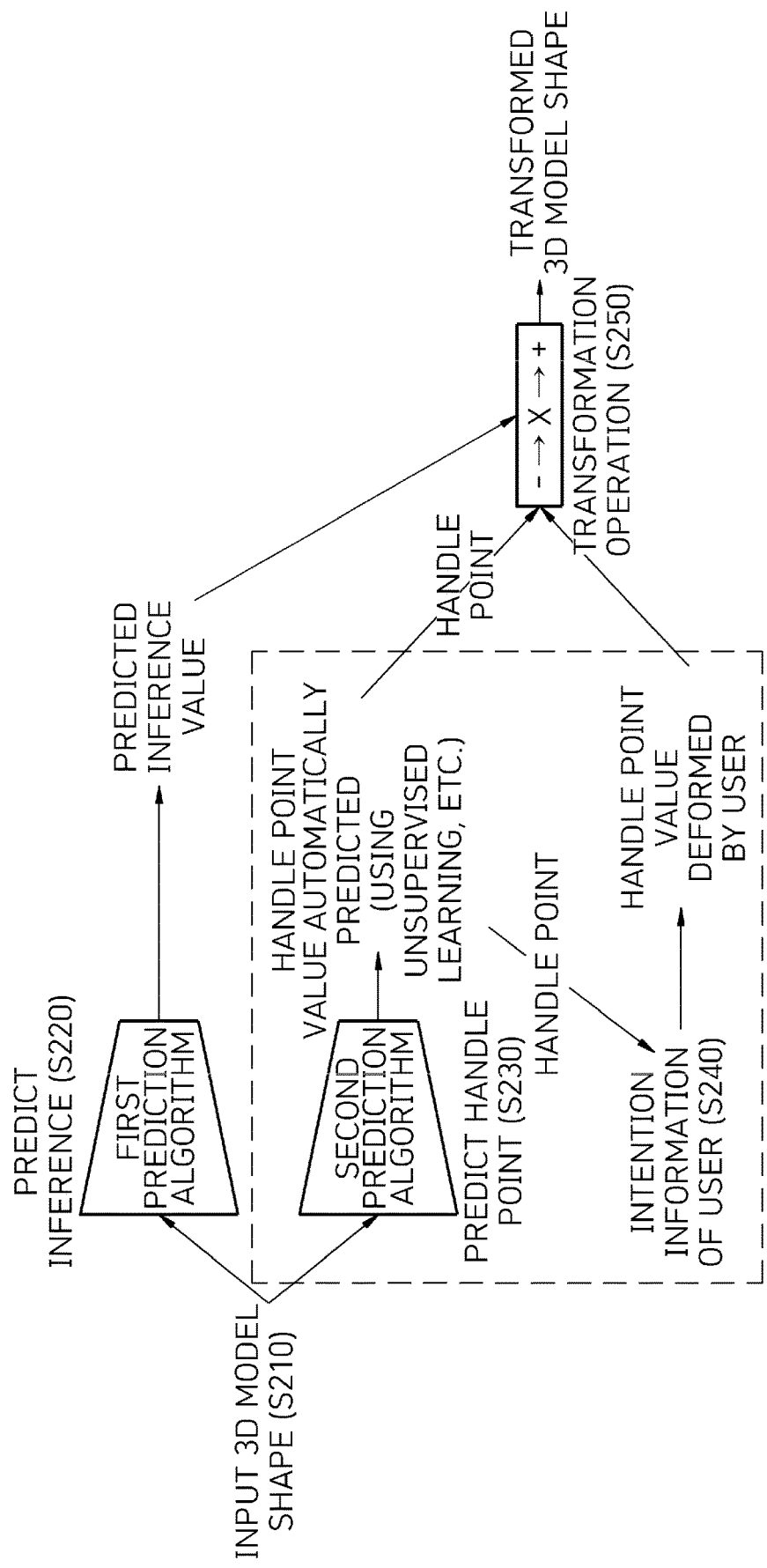
FIG. 2 is a diagram for describing an example of a mesh transformation method which is applied to an embodiment of the present disclosure.

FIG. 2 is a diagram for describing an example of a mesh transformation method which is applied to an embodiment of the present disclosure.

One of key steps of the present disclosure in the steps illustrated in FIG. 1 is step S140. In an embodiment, the present disclosure may apply a mesh transformation scheme illustrated in FIG. 2, but the present disclosure is not essentially limited thereto and does not exclude various mesh transformation schemes.

First, a 3D model shape of a similar target object is received (S210). In this case, in an embodiment of the present disclosure, the 3D model shape that is input data means a result value, including pre-processing for parameterizing a target object in a way to be transformable through a given data analysis process if the 3D model data in FIG. 1 does not include all types of attributes information (e.g., attributes of a real object) of the target object (e.g., a CAD and mesh data).

Next, an inference value of the input 3D model shape is predicted through a given first prediction algorithm that has been previously trained (S220).

In addition, a handle point for the input 3D model shape is predicted through a given second prediction algorithm that has been previously trained (S230). In an embodiment of the present disclosure, a handle point is also predicted and extracted from an input 3D model shape through the second prediction algorithm that has been previously trained, based on recent technologies based on a handle point in the transformation of a 3D model. In this case, the handle point means a location or region, that is, a key through which a user may transform a similar target object.

Next, intention information of a user is received based on the extracted handle point (S240). A transformed 3D model shape is generated by operating handle points transformed based on the predicted inference value, the handle point, and the intention information (S250).

In an embodiment of the present disclosure, when a user wants to interactively select and transform a real object within an XR environment, the user may transform a similar target object by incorporating at least one of attributes information of a target object, location information between the target object and the user, and information on a transformation range (e.g., the fineness of adjusting or the complexity of a manipulation) for the target object. This corresponds to a portion that is indicated by a dotted box in FIG. 2.

Hereinafter, a process of transforming a similar target object by incorporating attributes information of a target object is described.

Figure 3B:
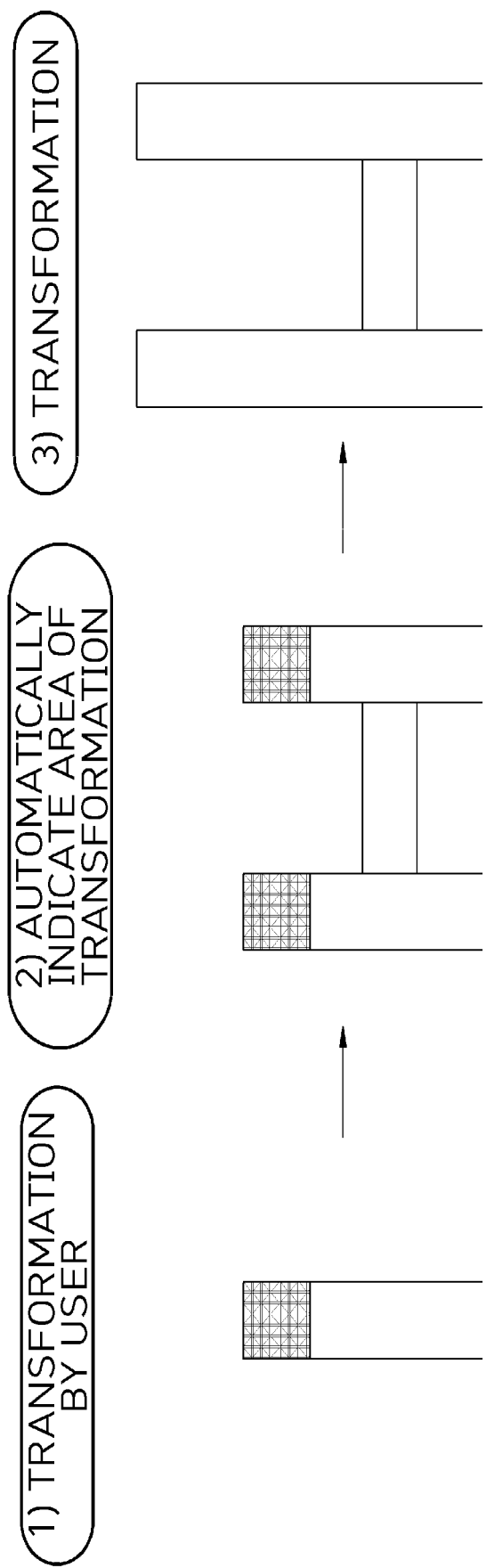

FIGS. 3a to 3c are diagrams for describing modified embodiments into which intention information of a user for a target object has been incorporated.

First, referring to an embodiment of a chair in FIGS. 3a and 3b, when a user inputs a transformation interaction to pull a corner on one side of the upper part of the chair, such transformation interaction intention of the user may be considered to be intention to longer transform the entire upper part of the backrest of the chair. The reason for this is that since most of objects in the real world have symmetry shapes, a user may expect that an object will be symmetrically transformed in a symmetry input model.

In contrast, referring to an embodiment of a cat in FIG. 3c, when a user inputs a transformation interaction to upward pull one ear of the cat, such transformation interaction intention of the user may be considered to be intention to change the cat in the direction in which only one ear of the cat has been transformed.

Furthermore, in the case of the embodiment of the chair in FIG. 3a, when a user inputs a transformation interaction to pull a side post of the backrest of the chair, the side post may be transformed in a way that the thickness of the side post is extended, but this may be estimated as being user intention to slope the entire backrest of the chair by further pulling the backrest of the chair toward the back of the user.

As described above, it is not easy to automatically determine, estimate, and predict user intention. Accordingly, in an embodiment of the present disclosure, intention information of a user may be estimated by inducing an interaction based on a human computer interaction (HCI) method. Furthermore, an embodiment of the present disclosure provides a process of visualizing estimated intention information of a user so that the user can recognize the estimated intention information. Furthermore, an embodiment of the present disclosure also provides a method capable of increasing the degree of freedom of a transformation of an object through a mode change when a user determines that estimated intention information of the user is different from his or her actual intention.

As described above, an embodiment of the present disclosure enables a user interaction to be more friendly and easily performed through an interaction induction technology (hereinafter referred to as "affordance") that induces an interaction in a user experience (UX)-based interface, that is, one of HCI technologies. Furthermore, an embodiment of the present disclosure proposes a method of estimating intention information of a user based on affordance and a method of visualizing the estimated intention information. An affordance-based user intention estimation method and an affordance-based visualization GUI method are described below.

First, the affordance-based user intention estimation method includes a first method of previously training a user by providing the user with a training program for a transformation graphic user interface (GUI) method for a target object and a second method of providing real-time learning to a user.

The first method of previously training a user by providing the user with the training program for the transformation GUI method for a target object is similar to a recent game method. In general, in order to notify a user who first plays game of a rule and method of the game, a tutorial is provided to the user before the user actually plays the game. Furthermore, the user may understand the rule and method of the game through experiences while actually taking actions related to the game or may understand the rule and method of the game based on understanding of the game while watching scenes of the game that is played by another person. The first method is also similar to such a method, and previously provides a user with a training program so that experience-based training is performed.

Furthermore, the second method of providing a user with the transformation GUI method for training in real time is a method of providing a user with a pre-defined transformation GUI method for a transformation of a similar target object so that the user can understand the transformation GUI method while directly using the transformation GUI method. Such a method corresponds to a method of inducing a user interaction by visualizing transformation parameters corresponding to a predefined GUI method and changing the transformation parameters step by step so that the user interaction can be induced as intended by a system. For example, such a method is a method of inducing a user to use another parameter by providing an animation effect in that a GUI related to a chair slope change parameter glitters, if it is determined that the user who wants to change a chair slope repeatedly transforms a chair thickness change parameter here and there.

FIG. 4 is a diagram for describing an embodiment of an affordance-based visualization GUI. The embodiment of FIG. 4 is described, assuming that a user interaction (e.g., a hand gesture, a touch on an XR device, or a cursor) is a "cursor" for easiness of a description.

In an embodiment, it is determined whether an interaction according to intention information of a user is generated within a preset first distance from a similar target object. Furthermore, when it is determined that the interaction is generated within the preset first distance, a transformable parameter for the similar target object is output.

In FIG. 4, when a user moves a cursor around a side post of the backrest of a chair (represented as a movement of the cursor in (A) of FIG. 4), three parameters (thick solid lines indicated in posts of the backrest of the chair) which may be transformed by the user appear in the side posts of the backrest of the chair. The three parameters may be indicated as solid lines having a given first color so that the user can intuitively check the three parameters.

Next, it is determined whether the interaction is generated within a preset second distance from the output parameters. When it is determined that the interaction is generated within the preset second distance, the color of a corresponding parameter is indicated differently from those of the remaining parameters in order to induce the selection of the user.

In the example of FIG. 4, when the cursor becomes close to one of the parameters, a corresponding parameter is selected in a way to be transformable (the corresponding parameter is represented as a solid line that is thicker than other thick solid lines, and a selected start is represented as "S" in (B) of FIG. 4). Next, a similar target object is transformed based on attributes of the selected parameter that have been previously assigned to the selected parameter as much as a direction in which the cursor has moved ((C) of FIG. 4). Such transformation is performed from the moment when the user selects (S, Start) the parameter to be transformed by the user to the moment when the user releases (F, Final) the cursor.

In addition, according to an embodiment of the present disclosure, objects which may be transformed in the real world may be visualized in various shapes (e.g., a corresponding object is overlaid and displayed in a mesh shape or a luminous effect is applied to the contour line of a corresponding object) on a GUI and provided to a user so that the user can recognize the objects (refer to FIGS. 6a to 6d).

In an embodiment of the present disclosure, when an interaction of a user is started and becomes close to a similar target object as described above, a corresponding object is represented and provided in the form of a primary GUI that has been visualized based on attributes of a real object. Thereafter, when the user actually uses the GUI, the intention of the user may be confirmed and may be represented and provided in the form of a secondary GUI.

As described above with reference to FIG. 3a, in the case of a chair object, assuming a case in which a user inputs a transformation interaction around a side post of the backrest of the chair, the user may input a transformation interaction to extend the thickness of the side post of the chair, or may input a transformation interaction to transform the slope of the backrest of the chair.

In an embodiment of the present disclosure, to this end, pre-processing for defining attributes of an object including component information for each object and attributes information of a component may be performed. The attributes information of the object may be visualized in a way to correspond to estimated intention information.

FIG. 5 is a diagram for describing attributes information of an object in an embodiment of the present disclosure.

An embodiment of the present disclosure proposes a method of defining component information for each object and attributes information of a corresponding component as attributes information of the object through pre-processing for a primary GUI and assigning the attributes information of the object.

Finally, in order to enable a transformation into which intention information of a user has been incorporated, as in FIG. 5, attributes information of a real objects needs to be previously known so that a GUI can be constructed in a way to well represent such attributes. In this case, user intention can be confirmed through the well-constructed GUI, and a transformation can be performed based on the user intention.

A user has been induced to transform an object through a primary GUI, but the user may quite freely transform a target object without being based on attributes of a real object. In this case, the primary GUI is changed into a secondary GUI due to a mode change.

That is, when estimated intention information of a user is different from actual intention of the user, the input of a mode change may be received from the user. A similar target object based on intention information may be transformed by increasing at least one degree of freedom of a transformation in an area (one spot in a minimum unit) of a similar target object in response to the input of such a mode change.

As an example of a method of determining, by a user, that a primary GUI is different from his or her intention, the user may determine that the primary GUI is different from his or her intention information through a method of inducing the user to use another parameter in the second method of training the user to learn the transformation GUI method in real time.

An example of the secondary GUI, that is, a mode change, includes a transformation that is not based on attributes of a real object, such as that a chair is bent and one portion of a chair sticks out. In this case, a transformation parameter may reinforce the easiness of a user interaction through the constraints of various methods, such as an area (a minimum unit is one point of an object) that is directly selected by the user and that will be transformed or an area of an object that is automatically segmented based on the aforementioned attributes information in the primary GUI.

Hereinafter, an embodiment in which a similar target object is transformed based on location information between a target object and a user and a transformation range (e.g., the fineness of adjusting or the complexity of a manipulation) of the target object is described.

FIGS. 6a to 6d are diagrams for describing a method of providing a customized GUI for each user.

In various AR devices or VR devices that have been developed and VR and AR, if a virtual object to be manipulated is far away from a user, in general, one of the following two methods is used. The method is that the user moves around the virtual object or the virtual object is pulled in front of the user.

If the user moves around the virtual object, a timing location of the user itself may move in front of the virtual object or only some (e.g., a virtual hand of the user) of a manipulation tool of the user may move in front of the virtual object. In particular, AR has focused on ensuring that a new virtual object is inserted into the real world and is in harmony with the real world that has now been inserted. Accordingly, the location of a virtual object to be handled by a user may be distant from or close to the user.

In contrast, XR, that is, the subject of application of the disclosure, is different from AR or VR. In XR, a transformed shape is displayed close to an actual image by modeling a real object that has already been placed in harmony with the real world in the form of a transformable virtual 3D object. Accordingly, it may be considered that a distance from a user is more related to a range of a real object to be transformed by the user and manipulation proficiency of the user.

Accordingly, an embodiment of the present disclosure may provide a different GUI depending on a transformation range in which how finely or complicatedly a user will transform a target object when transforming a real object in XR and how proficiently the user transforms the real object.

Figure 6A:
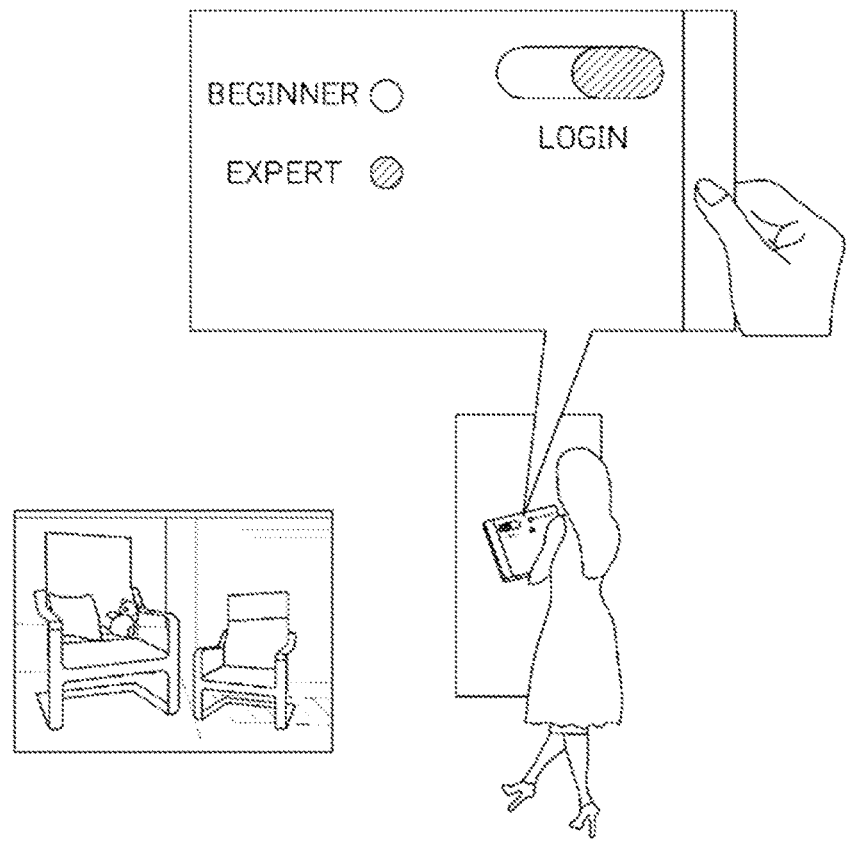
FIGS. 6a to 6d are diagrams for describing a method of providing a customized GUI for each user.

In an embodiment, referring to FIG. 6a, basic information of a user is input through the management of an account of the user so that a user skill and an object transformation range can be well determined.

Figure 6B:
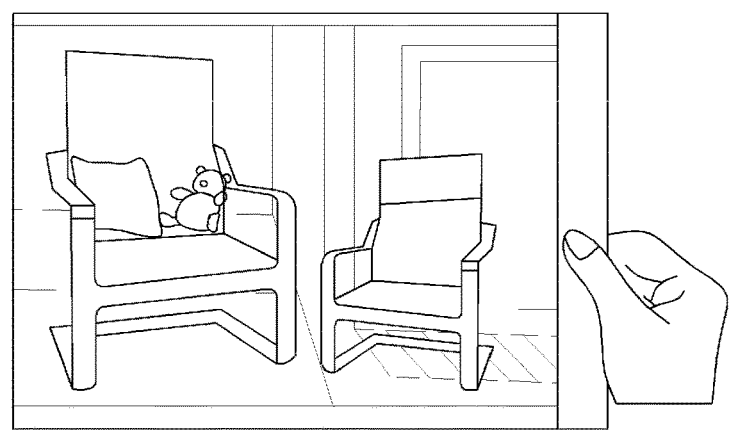
Figure 6C:
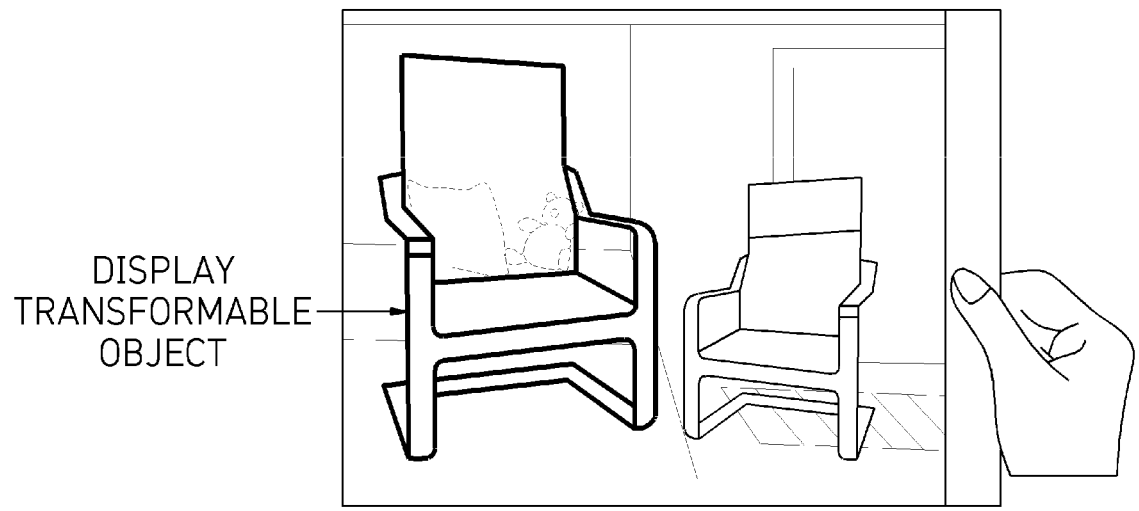

For example, if a user wants to select an expert mode, complicatedly transform (e.g., newly design) a real object shape such as FIG. 6b, and actually generate a product of the transformation based on a 3D printer, the user selects a target object having the highest degree of freedom of a transformation through the input of the aforementioned mode change. That is, not a primary GUI that automatically facilitates an interaction, but a secondary GUI that enables an object to be quite freely transformed is provided. Furthermore, for a fine manipulation, as illustrated in FIG. 6c, a transformable 3D model (e.g., a mesh transformation model) is output by being superimposed on a real object. Only the 3D model that has been superimposed on the real object is moved close to timing of a user, if necessary, so that the 3D model can be easily transformed.

Figure 6D:
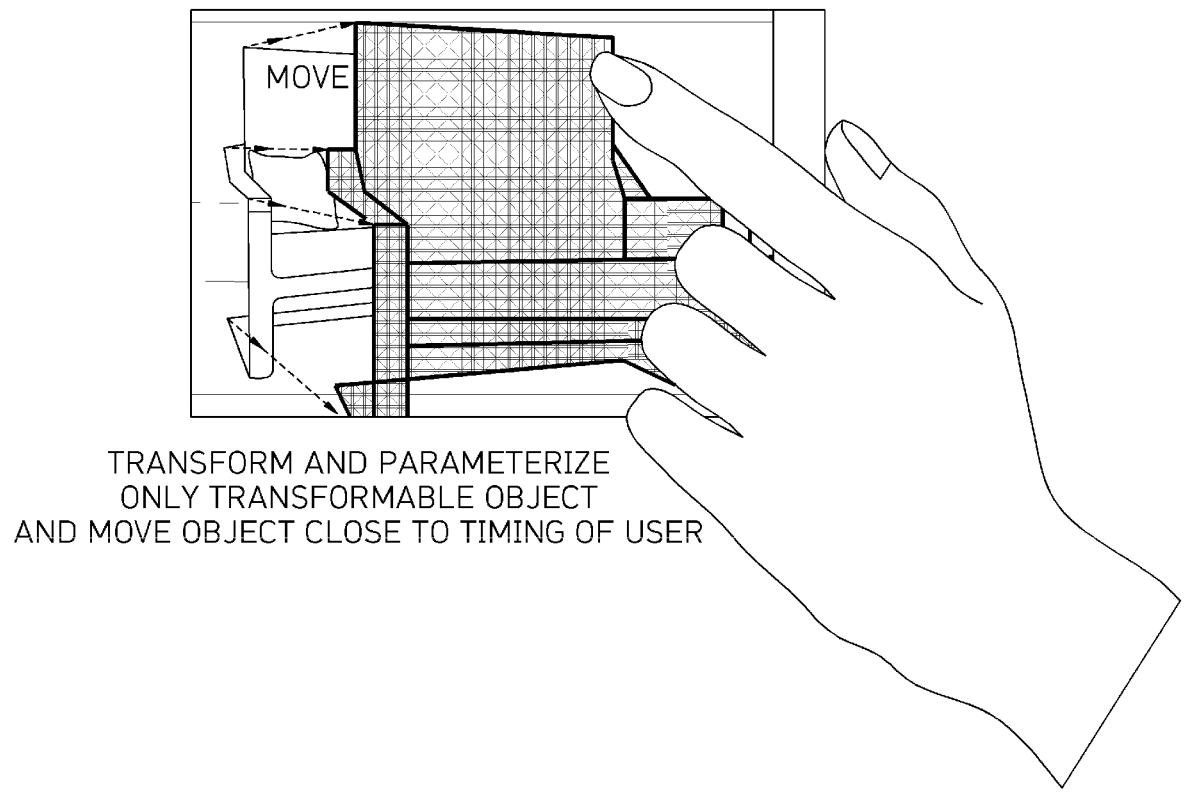

That is, as in FIG. 6d, only a transformable object can be moved close to timing of a user by transforming and parameterizing the object. The user can transform a corresponding 3D model with a high degree of freedom of a transformation.

In the aforementioned description, steps S105 to S190 may be further divided into additional steps or may be combined into smaller steps depending on an implementation example of the present disclosure. Furthermore, some steps may be omitted, if necessary, and the sequence of steps may be changed. Furthermore, the contents of FIGS. 1 to 6d may also be applied to the contents of the apparatus 100 for providing a user-interactive customized interaction for the transformation of an XR real object in FIG. 7.

Figure 7:
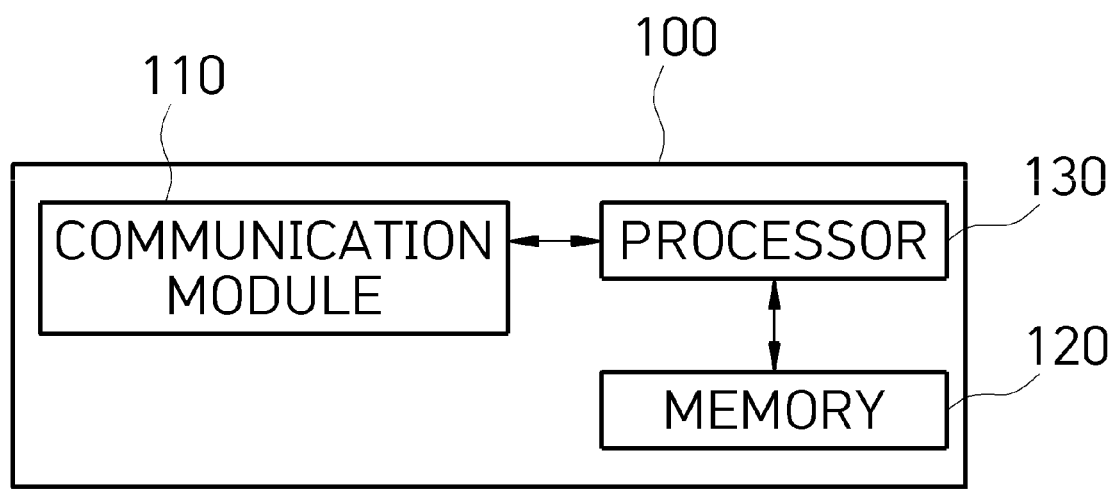
FIG. 7 is a block diagram of an apparatus for providing a user-interactive customized interaction for the transformation of an XR real object according to an embodiment of the present disclosure.

FIG. 7 is a block diagram of the apparatus 100 for providing a user-interactive customized interaction for the transformation of an XR real object according to an embodiment of the present disclosure.

The apparatus 100 for providing a user-interactive customized interaction for the transformation of an XR real object according to an embodiment of the present disclosure include s a communication module 110, a memory 120, and a processor 130.

The communication module 110 receives an image captured by a camera.

A program for segmenting a target object from a captured image and transforming and rendering the target object by incorporating intention information of a user based on a user interaction has been stored in the memory 120. The processor 130 executes the program stored in the memory 120.

The processor 130 segments a target object from an input image, and extracts a similar target object having the highest similarity to the target object from 3D model data that has been previously learnt. Furthermore, the processor 130 extracts texture of the target object through a camera, maps the texture to the similar target object, and transforms and renders a shape of the similar target object by incorporating the intention information of the user based on the user interaction.

The method of providing a user-interactive customized interaction for the transformation of an XR real object according to the aforementioned embodiment of the present disclosure may be implemented in the form of a program (or application) and stored in a medium in order to be executed in association with a computer, that is, hardware.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function that defines functions necessary to execute the methods, etc., and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, a cache, or a memory. Specifically, examples of the stored medium include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method of providing a user-interactive customized interaction for a transformation of an extended reality (XR) real object, the method being performed by a computer and comprising:
    segmenting a target object from among real objects in an input image received through a camera;
    extracting a similar target object having the highest similarity to the target object from three-dimensional (3D) model data that has been previously learnt;
    extracting texture of the target object through the camera;
    mapping the texture to the similar target object;
    transforming a shape of the similar target object by incorporating intention information of a user based on a user interaction; and
    rendering and outputting the transformed similar target object,
    wherein transforming the shape of the similar target object by incorporating intention information of the user based on a user interaction comprises:
        transforming the shape of target object symmetrically or asymmetrically based on the intention information of the user, and
        providing a different GUI depending on an input for a mode change and a transformation range.

2. The method of claim 1, wherein the transforming of the shape of the similar target object by incorporating the intention information of the user based on the user interaction comprises:
    receiving a 3D model shape of the similar target object;
    predicting an inference value of the 3D model shape through a given first prediction algorithm that has been previously trained;
    predicting and extracting from the 3D model shape a handle point for the 3D model shape through a given second prediction algorithm that has been previously trained;
    receiving the intention information of the user based on the predicted handle point; and
    transforming the 3D model shape based on the predicted inference value and handle point and a handle point that has been transformed based on the intention information.

3. The method of claim 2, wherein the receiving of the 3D model shape of the similar target object comprises receiving, as the 3D model shape, a result value of pre-processing for parameterizing the target object in a way to be transformed through a given data analysis process when the 3D model data does not include all pieces of attributes information of the target object.

4. The method of claim 1, wherein the transforming of the shape of the similar target object by incorporating the intention information of the user based on the user interaction comprises transforming the similar target object by incorporating at least one of attributes information of the target object, location information between the target object and the user, and transformation range information for the target object.

5. The method of claim 4, wherein the transforming of the shape of the similar target object by incorporating the intention information of the user based on the user interaction comprises:
    estimating the intention information of the user by inducing the user interaction based on a human computer interaction (HCI) method; and
    visualizing the estimated intention information so that the user is able to recognize the estimated intention information.

6. The method of claim 5, wherein the estimating of the intention information of the user comprises providing the user with a training program for a transformation graphic user interface (GUI) method for the target object.

7. The method of claim 5, wherein the estimating of the intention information of the user comprises:
    providing the user with a pre-defined transformation GUI method for the transformation of the similar target object; and
    inducing the user interaction by visualizing and changing a transformation parameter corresponding to the pre-defined transformation GUI method step-by-step in response to the user interaction.

8. The method of claim 5, wherein the visualizing of the estimated intention information so that the user is able to recognize the estimated intention information comprises:
    performing pre-processing for defining attributes information of an object comprising component information for each object and attributes information of a component; and
    visualizing the attributes information of the object so that the attributes information corresponds to the estimated intention information.

9. The method of claim 8, wherein the visualizing of the attributes information of the object so that the attributes information corresponds to the estimated intention information comprises:
    determining whether an interaction based on the intention information of the user is generated within a preset first distance from the similar target object;
    outputting a transformable parameter for the similar target object when the interaction is generated within the preset first distance;
    determining whether the interaction is generated within a preset second distance from the output parameter; and
    inducing the user to select a corresponding parameter by displaying a color of the corresponding parameter differently from a color of another parameter when the interaction is generated within the second distance.

10. The method of claim 5, wherein the transforming of the shape of the similar target object by incorporating the intention information of the user based on the user interaction comprises:
    receiving an input for a mode change from the user when the estimated intention information of the user is different from actual intention of the user; and
    transforming the similar target object based on the intention information by increasing a degree of freedom of a transformation for at least one of transformation regions of the similar target object in response to the input for the mode change.

11. The method of claim 1, further comprising inpainting a background image transformed due to the transformed similar target object,
    wherein rendering and outputting the transformed similar target object comprises rendering and outputting the transformed similar target object and the transformed background image.

12. An apparatus for providing a user-interactive customized interaction for the transformation of an extended reality (XR) real object, the apparatus comprising:
    a communication module configured to receive an image captured by a camera;

a memory in which a program for transforming and rendering a target object by incorporating intention information of a user based on a user interaction has been stored; and a processor configured to, when executing the program stored in the memory:
 segment the target object from among real objects in the input image,
 extract a similar target object having a highest similarity to the target object from 3D model data that has been previously learnt,
 extract texture of the target object through the camera, map the texture to the similar target object,
 transform and render a shape of the similar target object by incorporating the intention information of the user based on the user interaction,
 transform the shape of target object symmetrically or asymmetrically based on the intention information of the user, and
 provide a different GUI depending on an input for a mode change and a transformation range.

13. The apparatus of claim 12, wherein the processor
 predicts an inference value of a 3D model shape through a given first prediction algorithm that has been previously trained when receiving the 3D model shape of the similar target object,
 predicts and extracts from the 3D model shape a handle point for the 3D model shape through a given second prediction algorithm that has been previously trained,
 receives the intention information of the user based on the predicted handle point, and
 transforms the 3D model shape based on the predicted inference value and handle point and a handle point that has been transformed based on the intention information.

14. The apparatus of claim 13, wherein the processor receives, as the 3D model shape, a result value of pre-processing for parameterizing the target object in a way to be transformed through a given data analysis process when the 3D model data does not include all pieces of attributes information of the target object.

15. The apparatus of claim 12, wherein the processor transforms the similar target object by incorporating at least one of attributes information of the target object, location information between the target object and the user, and transformation range information for the target object.

16. The apparatus of claim 15, wherein the processor
 estimates the intention information of the user by inducing the user interaction based on a human computer interaction (HCI) method, and
 visualizes the estimated intention information so that the user is able to recognize the estimated intention information.

17. The apparatus of claim 16, wherein the processor
 provides the user with a pre-defined transformation GUI method for the transformation of the similar target object; and
 induces the user interaction by visualizing and changing a transformation parameter corresponding to the pre-defined transformation GUI method step-by-step in response to the user interaction.

18. The apparatus of claim 16, wherein the processor
 performs pre-processing for defining attributes information of an object comprising component information for each object and attributes information of a component, and
 visualizes the attributes information of the object so that the attributes information corresponds to the estimated intention information.

19. The apparatus of claim 18, wherein the processor
 determines whether an interaction based on the intention information of the user is generated within a preset first distance from the similar target object,
 outputs a transformable parameter for the similar target object when the interaction is generated within the preset first distance,
 determines whether the interaction is generated within a preset second distance from the output parameter, and
 induces the user to select a corresponding parameter by displaying a color of the corresponding parameter differently from a color of another parameter when the interaction is generated within the second distance.

20. The apparatus of claim 16, wherein the processor
 receives the input for the mode change from the user when the estimated intention information of the user is different from actual intention of the user, and
 transforms the similar target object based on the intention information by increasing a degree of freedom of a transformation for at least one of transformation regions of the similar target object in response to the input for the mode change.

* * * * *